United States Patent
Schroeder et al.

(10) Patent No.: US 10,988,602 B2
(45) Date of Patent: Apr. 27, 2021

(54) METHOD FOR TESTING THE IN SITU SILANIZATION OF BRIGHT FILLERS

(71) Applicant: LANXESS Deutschland GmbH, Cologne (DE)

(72) Inventors: Andreas Schroeder, Weinheim (DE); Lars Wawrzinski, Mannheim (DE); Ludwig Graeff, Viernheim (DE); Juergen Schilling, Schwetzingen (DE)

(73) Assignee: LANXESS Deutschland GmbH, Cologne (DE)

( * ) Notice: Subject to any disclaimer, the term of this patent is extended or adjusted under 35 U.S.C. 154(b) by 246 days.

(21) Appl. No.: 16/072,620

(22) PCT Filed: Jan. 19, 2017

(86) PCT No.: PCT/EP2017/051113
§ 371 (c)(1),
(2) Date: Jul. 25, 2018

(87) PCT Pub. No.: WO2017/129471
PCT Pub. Date: Aug. 3, 2017

(65) Prior Publication Data
US 2019/0031866 A1    Jan. 31, 2019

(30) Foreign Application Priority Data
Jan. 25, 2016    (EP) .................... 16152537

(51) Int. Cl.
*C08L 21/00* (2006.01)
*C08K 3/36* (2006.01)
(Continued)

(52) U.S. Cl.
CPC .............. *C08L 21/00* (2013.01); *C08C 19/25* (2013.01); *C08K 3/013* (2018.01); *C08K 3/36* (2013.01);
(Continued)

(58) Field of Classification Search
CPC .......... C08C 19/25; C08K 3/013; C08K 3/36; C08K 9/06; C08L 21/00; C08L 9/06;
(Continued)

(56) References Cited

U.S. PATENT DOCUMENTS 6,313,212 B1    11/2001    Caretta et al.
7,186,768 B2    3/2007    Korth et al.
(Continued)

FOREIGN PATENT DOCUMENTS

JP    2016087247 A2    5/2016

OTHER PUBLICATIONS

Lin et al., "Silanization Characterization and Compound Properties of Silica-Filled Rubber Containing a Blocked Mercapto Silane", Rubber Chemistry and Technology, vol. 90, No. 1, 2017. (Year: 2017).*

(Continued)

*Primary Examiner* — David A. Rogers
(74) *Attorney, Agent, or Firm* — Nicanor A. Kohncke

(57) ABSTRACT

The invention relates to a method of testing silanization, which permits inline control of the in situ silanization of light-colored fillers, especially precipitated silicas. This enables continuous in situ silanization in the production of rubber mixtures comprising silanized light-colored fillers, and representative control of the rubber mixture under production conditions. The process is additionally nondestructive and has a high tolerance for carbon black as an additional constituent of the rubber mixture.

20 Claims, 5 Drawing Sheets

Correlation of the relative sound attenuation coefficients with Mooney viscosity

(51) Int. Cl.

| | |
|---|---|
| *C09C 1/30* | (2006.01) |
| *C08K 9/06* | (2006.01) |
| *C09C 3/00* | (2006.01) |
| *C08L 9/06* | (2006.01) |
| *C08K 3/013* | (2018.01) |
| *C08C 19/25* | (2006.01) |
| *G01N 29/34* | (2006.01) |

(52) U.S. Cl.
CPC ............. *C08K 9/06* (2013.01); *C08L 9/06* (2013.01); *C09C 1/30* (2013.01); *C09C 3/00* (2013.01); *G01N 29/34* (2013.01); *C08L 2312/00* (2013.01)

(58) Field of Classification Search
CPC ......... C08L 2312/00; C09C 1/30; C09C 3/00; G01N 29/34
See application file for complete search history.

(56) References Cited

U.S. PATENT DOCUMENTS

| | | | |
|---|---|---|---|
| 8,846,816 | B2 | 9/2014 | Borkowsky et al. |
| 9,388,290 | B2 | 7/2016 | Schroeder et al. |
| 10,300,650 | B2 * | 5/2019 | Rischer ................ B29C 48/157 |
| 2003/0036593 | A1 * | 2/2003 | Goerl ...................... C08K 9/06 |
| | | | 524/261 |
| 2003/0200900 | A1 | 10/2003 | Korth et al. |
| 2014/0366633 | A1 | 12/2014 | Schroeder et al. |
| 2016/0297132 | A1 * | 10/2016 | Rischer ................ B29C 48/157 |
| 2019/0119429 | A1 * | 4/2019 | Lin ...................... A61L 27/222 |

OTHER PUBLICATIONS

Song et al., "Application of End-group Modified SSBR in Tread Compound of All-season Tire", Tire Industry, No. 30., 2019. (Year: 2019).*
Machine Translation of the Written Opinion for Application EP-16152537.3 dated Jun. 20, 2016. (Year: 2016).*
Final Decision for Application EP-16152537.3 on Jun. 16, 2018. (Year: 2018).*
Graeff, L. et al, "Rhenowave: Volumetric inline quality control for production of black rubber compounds", Rubberworld, Jan. 2015, vol. 251, No. 4, pp. 2-9.
Schoeder, Andreas, et al., "Better to hear than to see", available on the Internet at www.kgk-rubberpoint.de, Apr. 2015, pp. 10-15.
Jaunich, Matthias et al., "Monitoring the vulcanization of elastomers: Comparison of curemeter and ultrasonic online control", Polymer Testing 28 (2009) Elsevier, pp. 84-88.
European Search Report from corresponding European Application No. 16152537, dated Jun. 9, 2016, two pages.

* cited by examiner

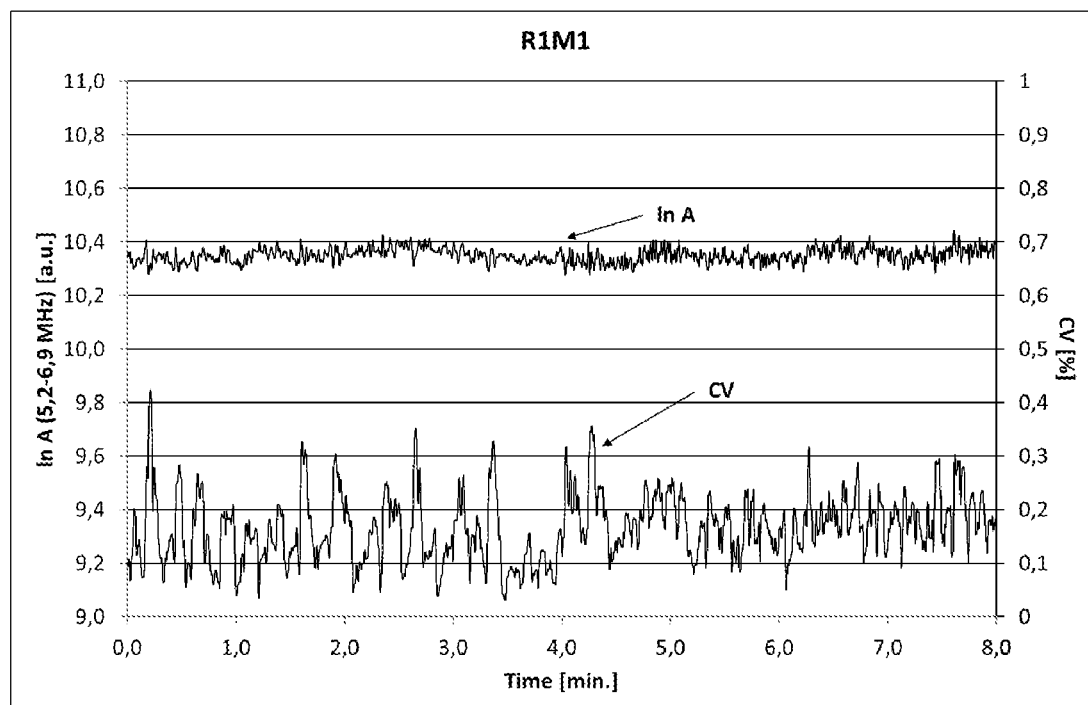
Fig. 4: Inline quality control for mixture batch R1M1
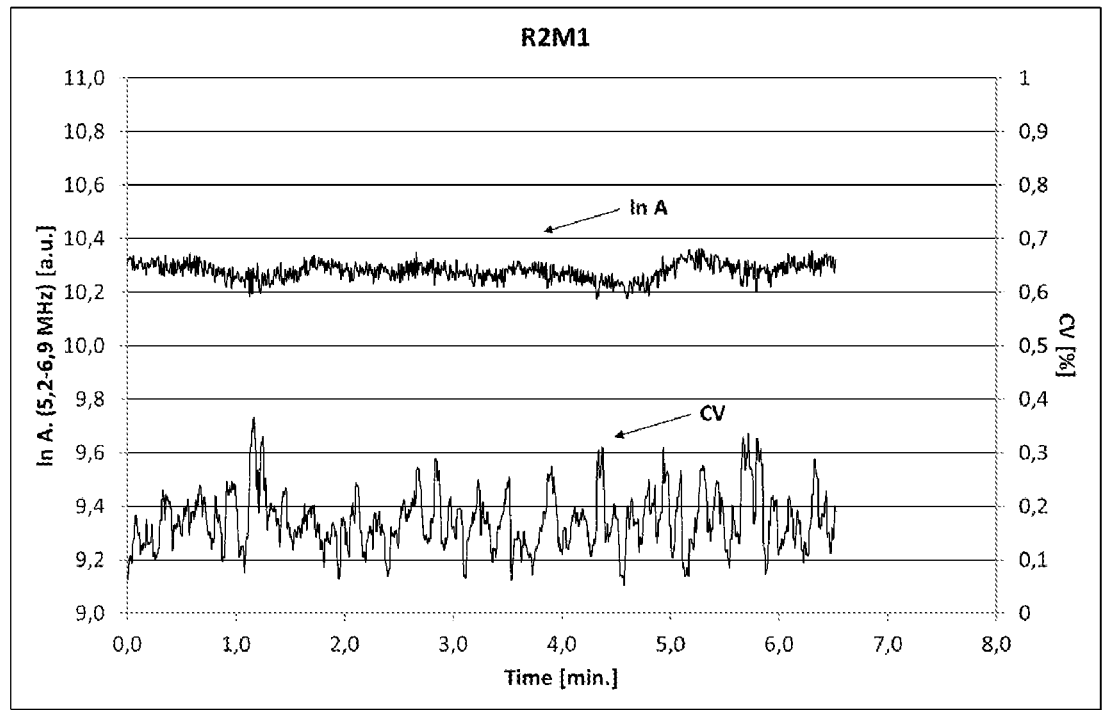
Fig. 5: Inline quality control for mixture batch R2M1

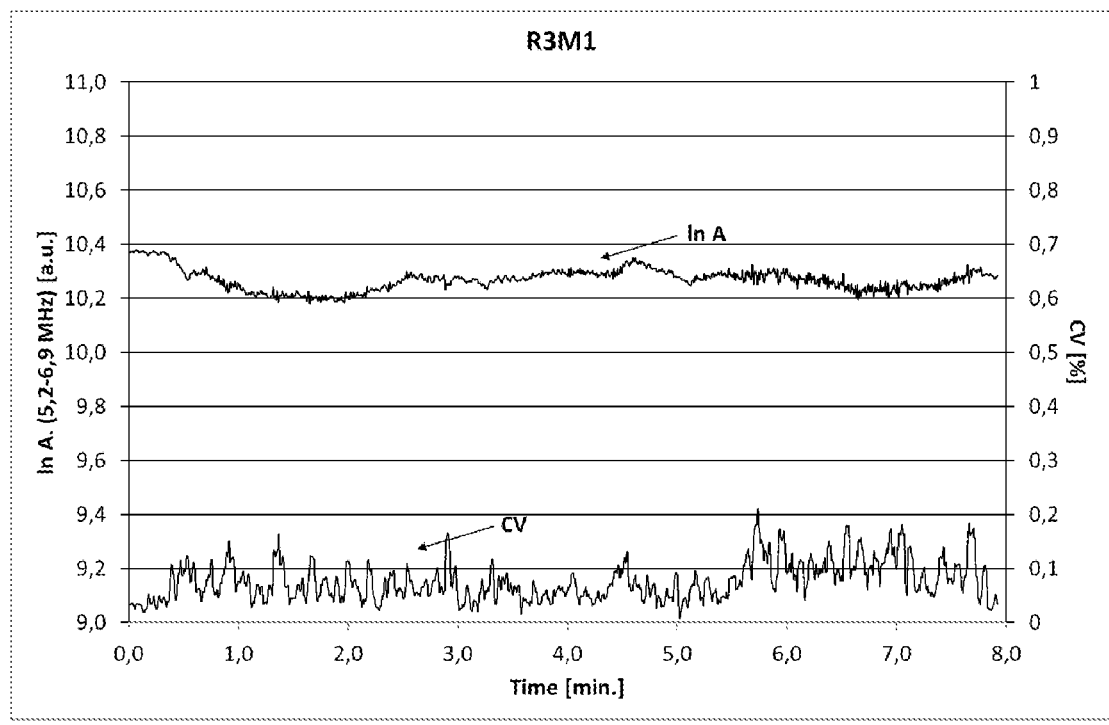
Fig. 6: Inline quality control for mixture batch R3M1
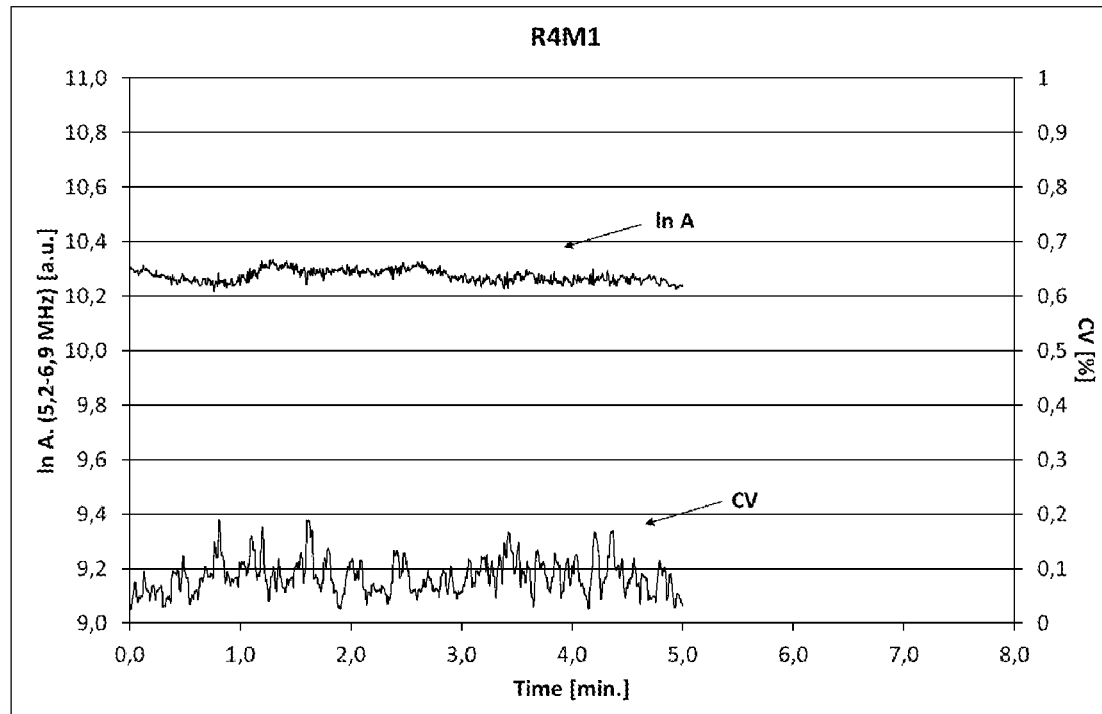
Fig. 7: Inline quality control for mixture batch R4M1

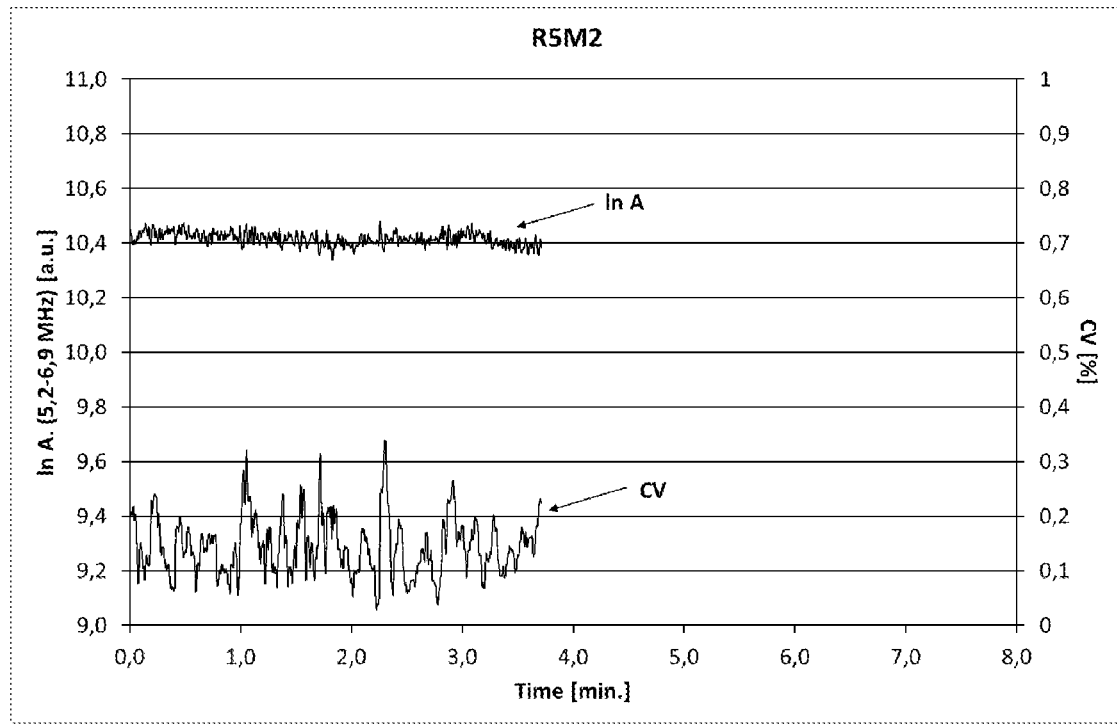
Fig. 8: Inline quality control for mixture batch R5M2
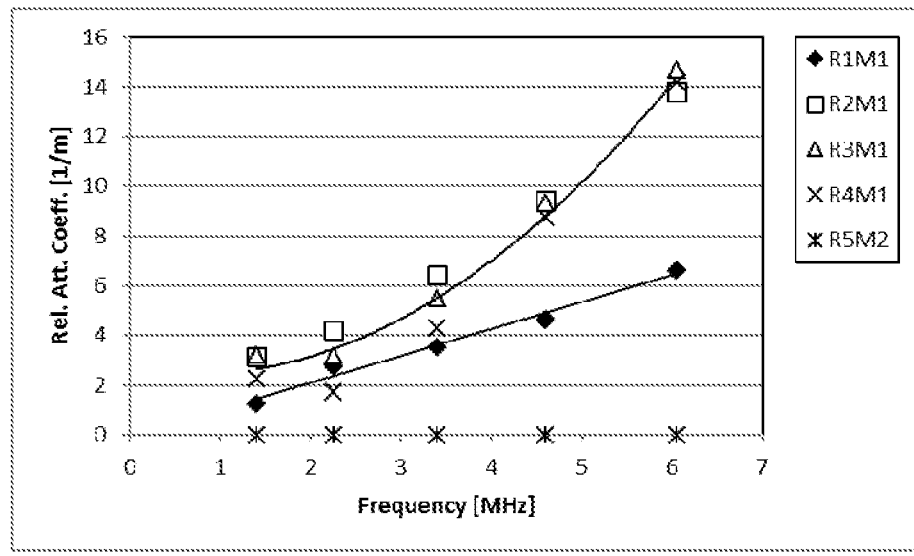
Fig. 9: Dependence of the relative sound attenuation coefficient on frequency for mixture batches R1M1 to R5M2 from table 4

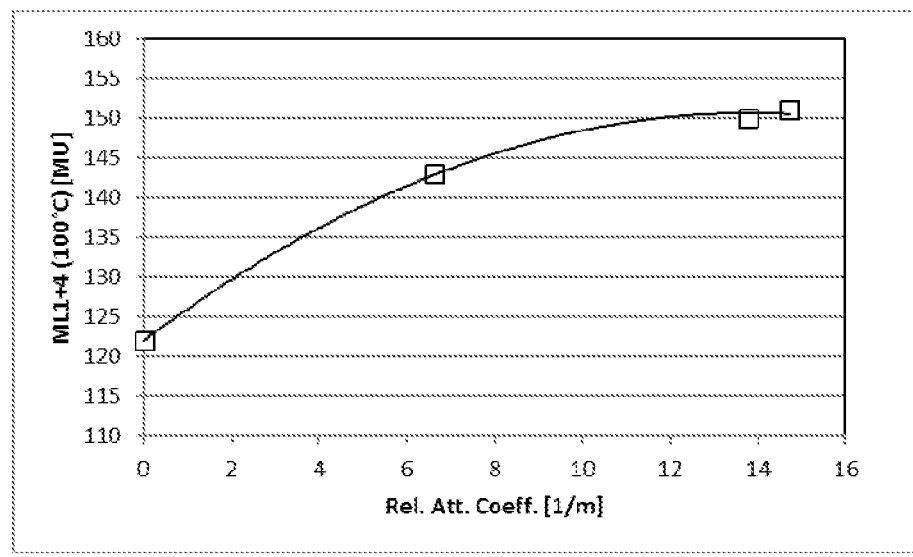
Fig. 10: Correlation of the relative sound attenuation coefficients with Mooney viscosity

METHOD FOR TESTING THE IN SITU SILANIZATION OF BRIGHT FILLERS

CROSS REFERENCE TO RELATED PATENT APPLICATIONS

The present patent application claims the right of priority under 35 U.S.C. § 119 (a)-(d) and 35 U.S.C. § 365 of International Application No. PCT/EP2004/001462, filed 17 Feb. 2004, which was published in German as International Patent Publication No. WO 2004/074379 A1 on 2 Sep. 2004, which is entitled to the right of priority of German Patent Application No.'s DE 103 07 713.8 and DE 103 26 666.6, each respectively filed on 24 Feb. 2003 and 13 Jun. 2003.

BACKGROUND OF THE INVENTION

The invention relates to the technical field of the silanization of light-colored fillers. Light-colored fillers are understood by the person skilled in the art to mean mineral natural and synthetic fillers that are not based on carbon black, for example mica, kaolins, chalks, calcium carbonates, talc, zinc oxides, aluminum oxides, titanium dioxides, silica and silicates. To improve processibility, the light-colored fillers are hydrophobized by silanization, which distinctly improves the properties of the elastomeric vulcanizates. Particularly in rubber mixtures for tire treads, the use of silanized fillers compared to the black filler carbon black leads to an improvement in wet skid resistance and rolling resistance, without increasing tire wear.

In the production of tire tread mixtures, for example, the silica is dispersed batchwise in en internal mixer with a silanizing agent in a $1^{st}$ mixing step in the rubber. This mixing process is run, via an adjustment of the mixing parameters (speed, fill level, temperature control, etc.) such that the ejection temperature is in the range from 140° C. to 160° C. In a second mixing step in the internal mixer, the mixture is homogenized once more in the range from 140° C. to 160° C. Below 140° C., no reaction of the silane with the silica takes place; above 160° C., the silane breaks down (cf., for example, F. Röthemeyer, F. Sommer; "Kautschuktechnologie Werkstoffe, Verarbeitung Produkte" [Materials from Rubber Technology, Processing of Products], Hanser Verlag $2^{nd}$ revised edition; ISBN 10: 3-448-40480-5; page 272). Internal mixers employed in the rubber industry also include internal mixers having a discharge extruder. As well as batchwise production methods, continuous methods with extruders are also being tested, as disclosed in DE69728538T2. Silanization in a rubber mixture is referred to as in situ silanization. This is described, for example, in EP-A-0911359 and also in EP-A-1 357156.

Since exact compliance is necessary with regard to the temperatures and mixing times in the in situ silanization, these methods are very prone to faults. Tests should therefore be conducted very quickly (inline), in a volumetric and representative manner. Only in this case can the in situ silanization be reliably controlled, the thermal stress on the rubber mixture can be kept low and the method efficiency can be kept high, and the reject rates can be reduced. This is all the more true in the case of the continuous method for in situ silanization, which has not yet become established on the market owing to the inadequate means of inline testing among other reasons.

By contrast with the requirements for monitoring of in situ silanization, measurements on uncrosslinked rubber mixtures in the rubber industry generally cannot be conducted until several minutes or even days after the production of the rubber mixture ("offline methods"), since the measurements are time-consuming and simultaneous measurement on multiple samples requires a multitude of costly analytical apparatuses. Therefore, the quality of an uncrosslinked rubber mixture has to date been tested merely by random sampling (<0.1% of the total volume). Typically, the Mooney viscosity of the random samples of the rubber mixture is determined in order to verify the completeness of the silanization reaction (cf. F. Röthemeyer, F. Sommer; "Kautschuktechnologie Werkstoffe, Verarbeitung Produkte", Hanser Verlag $2^{nd}$ revised edition; ISBN 10; 3-446-40480-5; page 390). However, the small number of random samples is not representative of the overall rubber mixture. Moreover, it has not been possible to date to implement the means of quality control described in an automated manner for method-related reasons, which increases the time demands.

There is a multitude of known representative inline quality controls for the analysis of polymers compounded with extruders, for example NIR, Raman and UV/VIS spectroscopy, in which radiation is passed through the samples (cf. Hochrein et al., Plastverarbeiter, September 2009, p. 92). When electromagnetic waves are used, however, the carbon black is disruptive since the electromagnetic waves are virtually completely absorbed even in the case of very small proportions of carbon black. In the case of use of mechanical pressure waves in the high frequency range >1 MHz (ultrasound waves), by contrast, carbon black is disruptive to a comparatively minor degree. Here, however, light-colored fillers having a high density such as silica, kaolin or chalk are disruptive (cf. A. Schröder, L. Graff. L. Wawrzinski, Rubber World 251 (2015) 4), since these attenuate the ultrasound waves more significantly than carbon black having a lower density. Moreover, uncrosslinked rubbers, by contrast with polymers, owing to their viscoelastic properties, intrinsically already have relatively high attenuation. Owing to this high attenuation, there is an upper limit for the distance between the emitting and receiving ultrasound transducers in the case of volumetric measurements in transmission. If this limit is exceeded, the signal/noise ratio is too poor to obtain usable measurements.

On the other hand, there is a lower limit since the high-viscosity rubber mixture still has to flow between the ultrasound transducers. For instance, Rubber World 251 (2015) 4 describes the use of ultrasound as inline quality control for the detection of varying proportions of filler and crosslinker masterbatches with markers, and also the detection of impurities larger than 100 μm and the macroscale dispersion of fillers, but only up to a proportion of 30 phr of light-colored fillers. The proportion of light-colored fillers in rubber mixtures for tire treads is generally above 60 phr, which leads to an increase in the viscosity of the rubber mixture. Moreover, the use of ultrasound for monitoring a chemical reaction in in situ silanization has neither been disclosed or suggested.

The monitoring of a chemical reaction, namely the crosslinking of an uncrosslinked rubber with sulfur, is described in M. Jaunich, B. Stark, B, Hoster, Polymer Testing 28 (2009) 84. However, what is being monitored here is the change in the crosslinking density with the aid of the speed of sound, and not the relative sound attenuation coefficient. Ultrasound transducers having a mean frequency of f=4 MHz are used here. No extrusion of the mixture takes place.

There was therefore a need for a representative inline method of monitoring the in situ silanization of light-colored fillers. The method was to allow inline monitoring of the in situ silanization of light-colored fillers, especially silicas. It was to be possible here to determine, with a minimum time delay, whether and to what extent the silanization of the filler surface has taken place. Preferably, the result of the quality control was to be available no later than one minute after exit from the extruder, in order thus to enable immediate feedback to the method control and to enable an increase in productivity and/or a decrease in the reject rates from the process. The process was preferably also to allow representative control, i.e. to enable testing of at least 1% of the rubber mixture comprising silanized light-colored filler, preferably under production conditions, i.e. at throughputs of a ≥5 kg/h, more preferably 50 kg/h. A nondestructive method would be particularly advantageous. In order to enable use of the method in the production of rubber mixtures for tires, it would be desirable for carbon black as an additional constituent of the rubber mixture to impair quality control only to a minor degree, if at all.

BRIEF SUMMARY OF THE INVENTION

Surprisingly, the object is achieved by a method of testing the silanization of light-colored fillers, wherein a mixture comprising at least one silanized light-colored filler and at least one rubber is extruded, the extrudate obtained thereby is subjected to ultrasound waves within a frequency range from 4 to 10 MHz, and the signal intensity of the ultrasound waves is determined after transmission through the extrudate. This can be used to determine the soundwave amplitude and/or soundwave intensity of the ultrasound waves after transmission through the extrudate. In a preferred embodiment, the relative attenuation coefficient $\alpha_{rel}$ of the extrudate is determined in the frequency range of the ultrasound waves.

DETAILED DESCRIPTION OF THE INVENTION

Preferably, the temperature of the extrudate during the exposure to ultrasound is above the glass transition range of the rubber mixture, in the frequency range of ultrasound waves. Typically, the temperature of the extrudate is at least 100° C.

Preferably, the pressure in the extrudate during the exposure to ultrasound is at least 10 bar.

Preferably, ultrasound waves in the frequency range from 5 to 7 MHz are used. The measurement can be conducted using ultrasound waves of one or more frequencies f. In the case of exposure to a frequency spectrum, the use of ultrasound waves in the range from, for example, 5 to 7 MHz should typically be understood such that, at the emitted ultrasound frequency f, the arithmetic mean of the limiting frequencies, i.e. the lower and upper frequencies, at which the ultrasound wave amplitude or the ultrasound wave intensity is 50% of the maximum value, is from 5 to 7 MHz.

In the context of the present invention, the testing of silanization may comprise both the qualitative determination of the silanization and the quantitative determination of the degree of silanization of the filler.

The extrudate is typically an uncrosslinked rubber mixture which preferably does not contain any crosslinking agents.

Rubbers that are especially suitable include natural rubber (NR), isoprene rubber (IR), styrene-butadiene rubber (SBR), butadiene rubber (BR), isoprene-isobutylene rubber (IIR), polychloroprene rubber (CR), acrylonitrile-butadiene rubber (NBA), hydrogenated acrylonitrile-butadiene rubber (HNBR), carboxylated acrylonitrile-butadiene rubber (XNBR), hydrogenated carboxylated acrylonitrile-butadiene rubber (HXNBR), ethylene-propylene-diene rubber (EPOM), ethylene-propylene rubber (EPM), fluoro rubber (FKM), perfluorinated fluoro rubber (FFKM), acrylate-ethylene rubber (AEM), acrylate rubber (ACM), ethylene-methylene-acrylate rubber (EMA), chlorinated polyethylene, chlorosulfonated polyethylene, ethylene-vinyl acetate rubber (EVA), silicone rubber, fluoro silicon rubber, ethylene-epichlorohydrin rubber (ECO), epichlorohydrin rubber (CO) and/or polyurethane rubber (PU). Particular preference is given to natural rubber (NR), isoprene rubber (IR), styrene-butadiene rubber (SBR), butadiene rubber (BR).

Preferred light-colored fillers in the context of the invention are mica, kaolin, siliceous earth, calcium carbonates, zinc oxides, aluminum oxides, titanium dioxides, silica, chalk and talc, more preferably silicas and most preferably precipitated silicas. In a specific embodiment of the present invention, it is possible to use what are called dual phase fillers as light-colored filler. These are carbon black particles having a proportion of >5% of silicas, which are known to those skilled in the art.

The proportion of filler in the rubber mixture is typically 50 to 250 phr, preferably 60 to 150 phr and more preferably 70 to 100 phr.

In one embodiment of the method of the invention, the extrudates are analyzed with at least one pair, preferably with at least one detection band of at least two pairs, of ultrasound transducers. The respective transducers of a pair are opposite one another; the pairs are arranged in series alongside one another. The distance between the transducers in a pair is preferably more than 5 mm to 30 mm, more preferably from 10 to 25 mm and most preferably 15 to 20 mm.

One ultrasound transducer of a pair functions as emitter and the other transducer as receiver of the ultrasound signal. In the emitter, voltage pulses generated in the testing electronics are converted to ultrasound waves with the aid of the piezoelectric effect. Typically, a voltage pulse, in the excitation of the emitter, takes the form of a rectangular pulse or a needle pulse. Preferably, at least two voltage purses (burst signals) are used successively, separated by ≥0.01 µs; more preferably at least seven voltage pulses and most preferably at least fourteen voltage pulses are used. More preferably, the reciprocal separation in time between the voltage pulses of a burst signal corresponds to the intrinsic frequency of the ultrasound transducer used. The emission of an ultrasound signal consisting of a single voltage pulse or of burst signals is preferably repeated with a frequency of at least 1 Hz, more preferably at least 10 Hz. In the receiver, the ultrasound waves are converted back to voltage signals during the extrusion after transmission through the rubber mixture, and can be evaluated promptly (within less than 1 min).

The extrudate is in the gap between the ultrasound transducers. There is preferably direct contact between the ultrasound transducers and the extrudate. The gap is preferably bounded at the sides, giving rise to a flow channel with a height of ≥5 mm, more preferably with a height of a ≥10 mm, most preferably with a height of a ≥20 mm. Preferably, the width of the flow channel is ≥20 mm, more preferably ≥50 mm, most preferably a ≥100 mm. The extrudate passes through the detection band at a speed of preferably 0.1 m/min, or more, more preferably 1 m/min, or more, most preferably, 10 m/min, or more. Preference is given to using an extruder for this purpose. In this case, a portion of the rubber mixture, preferably a ≥1%, more preferably a ≥10%, especially preferably ≥100%, of the extruded rubber mixture is analyzed with the ultrasound. In this way, representative quality control, not just by random sampling, of rubber mixtures is possible.

In one embodiment of the invention, the amplitude of the sound waves converted to voltage signals is measured as a function of the time that has passed since the emission of the sound signal in the emitter. These are called A scans and are registered as a function of time.

In one embodiment of the invention, the signal intensity of the ultrasound waves from the ultrasound signal of an A scan is quantified by determining the value of ultrasound wave amplitude, preferably the maximum ultrasound wave amplitude, and potting the logarithm of the ultrasound wave amplitude a against time t.

Preferably, the ultrasound signal of an A scan and not the echo of the ultrasound signal is evaluated.

In a further embodiment of the invention, the ultrasound wave intensity i is determined by squaring the ultrasound wave amplitude a, and the logarithm of the ultrasound wave intensity i is plotted against time t.

Preferably, the relative damping coefficient $\alpha_{rel.}$ is determined by the formula (1a)

$$\alpha_{rel.} = (\ln a_{rel.} - \ln a)/x = (\ln I_{rel.} - \ln i)/2x \quad (1a)$$

from the ultrasound wave amplitude a and the ultrasound wave amplitude $a_{rel.}$ of a reference and the distance x between the ultrasound transducers. Alternatively, the relative damping coefficient $\alpha_{rel.}$ can be determined from the ultrasound wave intensity i, ultrasound wave intensity $i_{rel}$ of a reference and the distance x between the ultrasound transducers.

In a further embodiment of the invention, the values of the ultrasound signal are squared and then integrated and hence the integral ultrasound wave intensity I is determined. Alternatively, the integrated ultrasound wave amplitude A can be determined from the square root of the ultrasound wave intensity I.

More preferably, the relative attenuation coefficient $\alpha_{rel}$ is determined by the formula (1b) with the aid of the integrated ultrasound wave intensity I and/or the integrated ultrasound wave amplitude.

$$\alpha_{rel.} = (\ln A_{rel.} - \ln A)/x = (\ln I_{rel.} - \ln I)/2x \quad (1b)$$

In a preferred embodiment of the invention, with the aid of fast Fourier transformation (FFT), the frequency spectrum a(f) of the ultrasound wave amplitude or the ultrasound wave intensity i(f) is determined.

Preferably, the relative attenuation coefficient $\alpha_{rel}$ is determined as a function of the frequency f by the formula (1c)

$$\alpha_{rel.}(f) = (\ln a_{rel.}(f) - \ln a(f)/2x = (\ln i_{rel.}(f) - \ln i(f))/2x \quad (1c)$$

from the ultrasound wave amplitude a of the ultrasound wave amplitude $\alpha_{rel}$ of a reference or from the ultrasound wave intensity i of the ultrasound wave intensity $i_{rel}$ of a reference and the distance x between the ultrasound transducers.

In a particularly preferred embodiment of the invention, the frequency spectrum is divided into frequency ranges having a minimum frequency of $f_{min}$ and a maximum frequency $f_{max}$ and integrated. Preferably, these frequency ranges contain a maximum of the ultrasound wave amplitude or the ultrasound wave intensity.

Preferably, the relative attenuation coefficient $\alpha_{rel}$ is determined as a function of the frequency range from $f_{min}$ to $f_{max}$ inclusive by the formula (1d)

$$\alpha_{rel.}(f_{min.}, f_{max.}) = (\ln A_{rel.}(f_{min.}, f_{max.}) - \ln A(f_{min.}, f_{max.}))/x \quad (1d)$$
$$= (\ln I_{rel.}(f_{min.}, f_{max.}) - \ln I(f_{min.}, f_{max.}))/2x$$

from the ultrasound wave amplitude a of the ultrasound wave amplitude $a_{rel}$ of a reference and the distance x between the ultrasound transducers.

Alternatively, the relative attenuation coefficient $\alpha_{rel}$ can be determined from the ultrasound wave intensity i, ultrasound wave intensity $i_{rel}$ of a reference and the distance x by the formula (1b).

Preferably, the relative attenuation coefficient $\alpha_{rel}$ is determined at the intrinsic frequency of the ultrasound transducers.

In one embodiment of the invention, the signal intensity of the ultrasound wave signal of the reference is determined by the extrusion of a rubber mixture of at least 1 kg under comparable process and measurement conditions during the extrusion. Comparable process and measurement conditions during the extrusion and the measurement exist when the changes in the throughput are less than 10%, the changes in the temperature of the extrudate between the ultrasound transducers and the ultrasound transducer are less than <±5 K and changes in the pressure p in the extrudate between the ultrasound transducers are less than <±5 bar. Preference is given to process and measurement conditions when the changes in the throughput are less than 5%, the changes in the temperature of the extrudate between the ultrasound transducers and the ultrasound transducer are less than <±2 K and changes in the pressure in the extrudate between the ultrasound transducers are less than <±2 bar. Particular preference is given to process and measurement conditions when the changes in the throughput are less than 2%, the changes in the temperature of the extrudate between the ultrasound transducers and the ultrasound transducer are less than <±1 K and changes in the pressure in the extrudate between the ultrasound transducers are less than <±1 bar.

Particular preference is given to using, as reference mixtures, a rubber mixture having the same composition as the rubber mixture to be examined, the silanization having been conducted in an optimal manner in the reference mixture.

In a preferred embodiment, the distance x between the ultrasound transducers is determined with the aid of inside calipers having an accuracy of better than 0.1 mm.

In a further embodiment of the invention, in addition, the coefficient of variation (CV) of the logarithm of the ultrasound wave amplitude or the ultrasound wave intensity is determined. Preference is given here to using fewer than 1000 measurements, more preferably fewer than 100 measurements, most preferably fewer than 10 measurements.

In a preferred embodiment, as well as the relative attenuation coefficient, the standard deviation σ of the relative attenuation coefficient is determined. Preference is given here to using fewer than <1000 measurements, more preferably fewer than 100 measurements, most preferably fewer than 10 measurements.

In a further embodiment, as well as the relative attenuation coefficient, the speed of sound $V_S$ in the extrudate is determined by formula (2).

$$V_S = x/(t_{oF} - t_{US}) \quad (2)$$

The period of time $t_{oF}$ is required by the ultrasound signal from the time of emission in the emitter until reception in the receiver. The period of time $t_{US}$ is required by the ultrasound signal in the ultrasound transducers. The period of time $t_{US}$ is determined at temperatures for ultrasound transducers that are comparable to those during the extrusion. The period of time $t_{US}$ is determined by determining $t_{oF}$ with varying distance x between the ultrasound transducers. Preference is given here to using the reference mixture between the ultrasound transducers. Preferably, at least four distances in the range from 5 mm to 30 mm are set. The period of time $t_{US}$ is found from the axis intercept of a linear regression of the plot of $t_{oF}$ against the distance x between the ultrasound transducers.

Insufficiently silanized light-colored fillers lead to lowering of the ultrasound wave amplitude a or of the ultrasound intensity i at the receiver and to an increase in the relative attenuation coefficient $\alpha_{rel}$. The speed of sound $V_S$ remains unchanged. The coefficient of variation CV or the standard deviation $\sigma$ of the relative sound attenuation coefficient $\alpha_{rel}$ reflects the homogeneity of the rubber mixture.

In a preferred embodiment, the rubber passes through a detection band composed of one or more ultrasound sensor pairs arranged across the entire width of the flow channel.

In a particularly preferred embodiment, the rubber mixture passes through two detection bands slightly offset from one another. This ensures that the complete rubber mixture is analyzed.

BRIEF DESCRIPTION OF THE SEVERAL VIEWS OF THE DRAWINGS

FIG. 4 plots an inline quality control for mixture batch R1M1 of the Examples.

FIG. 5 plots an inline quality control for mixture batch R2M1 of the Examples.

FIG. 6 plots an inline quality control for mixture batch R3M1 of the Examples.

FIG. 7 plots an inline quality control for mixture batch R4M1 of the Examples.

FIG. 8 plots an inline quality control for mixture batch R5M1 of the Examples.

FIG. 9 plots the dependence of the relative sound attenuation coefficient on frequency for mixture batches R1M1 to R5M2 of table 4 of the Examples.

FIG. 10 illustrates the correlation of the relative sound attenuation coefficients with Mooney viscosity.

Figure 1:
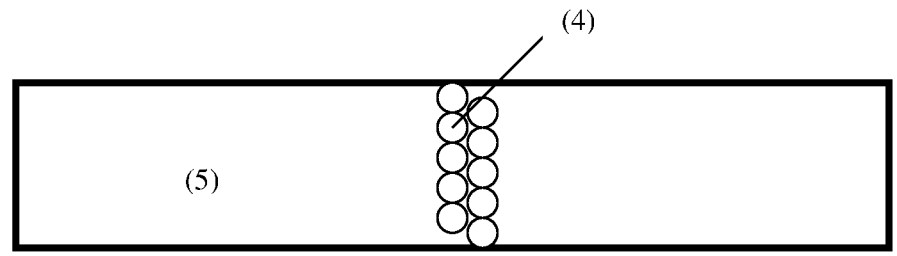
FIG. 1 schematically illustrates, by way of example, the detection band consisting of the ultrasound sensor pairs (4), i.e. one transmitter and one receiver for each pair, and the flow channel (5) in top view.
Figure 2:
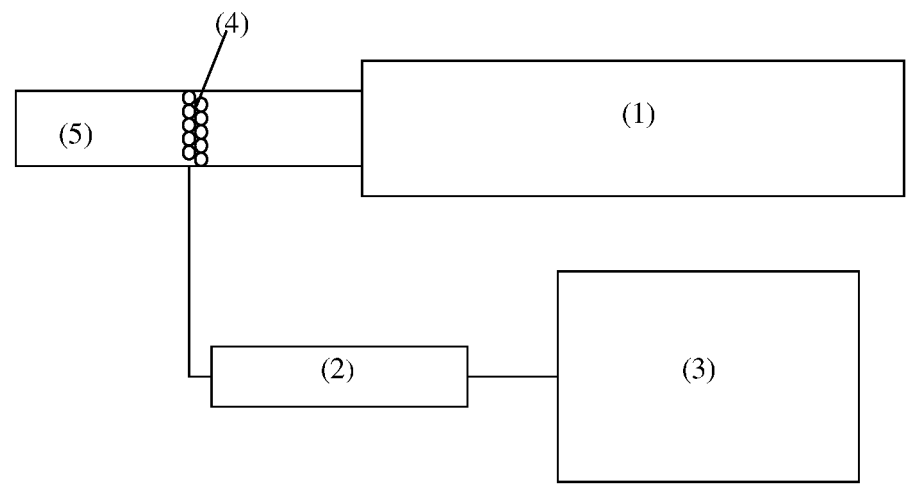
FIG. 2 schematically illustrates the arrangement in FIG. 1 in side view.
Figure 3:
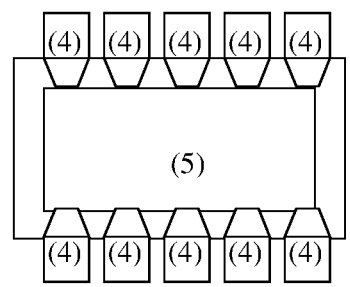
FIG. 3 schematically illustrates an arrangement composed of an extruder (1), the detection band consisting of the ultrasound transducer pairs (4) and the flow channel (5) and the ultrasound sensor electronics (2), and a computer as evaluation unit (3).

The invention additionally provides a method of producing rubber mixtures comprising silanized light-colored fillers, wherein at least one light-colored filler is mixed with at least one rubber and at least one silanizing agent and silanized, and wherein at least a portion of the rubber mixture obtained is tested by the method of the invention for testing of silanization. Preferably more than 1% by volume, more preferably more than 10% by volume, most preferably 100% by volume, of the rubber mixture obtained is tested by the method of the invention for testing of silanization. The method of the invention can be conducted continuously or as a batchwise method, preferably continuously.

In a further preferred embodiment of the method of the invention, the extruder is used simultaneously as mixing unit for the production of the rubber mixture, as well as in situ silanization and for production of the extrudate by the testing method of the invention. In this case, at least one light-colored filler, one silanizing agent and one rubber each are fed to the extruder, and the silanized filler is formed therein from the silanizing agent and the light-colored filler.

The silanizing agent used is preferably at least one silane. Silanes in the context of the invention are compounds containing silicon and hydrogen, and also further atoms of other chemical elements. Preference is given to silanes with trialkoxysilyl groups. Preference is further given to bifunctional silanes in which one functional group can react with the surface of a light-colored filler, for example trialkoxysilyl groups, and the other functional group can take part in the crosslinking reaction of the rubber, for example vinyl, thiol or polysulfane groups.

Very particular preference is given to the following silanes:

bis(3-triethoxysilylpropyl) tetrasulfide (Si69), bis(triethoxysilylpropyl) disulfide (Si75), bis(tri-ethoxysilylpropyl) disulfide (Si266), 3-thiocyanatopropyltriethoxysilane (Si264). VP Si 363® (from Evonik Industries), vinyltriethoxysilane, vinyltris(beta-methoxyethoxy)silane, gamma-mercaptopropyltrimethoxysilane, gamma-aminopropyltrimethoxysilane, gamma-glycidoxypropyltrimethoxysilane, aminoethyl-gamma-aminopropyltrimethoxysilane, triamino-functional silanes, gamma-chloropropyltriethoxysilane, tris(1-methoxyethoxypropyl-2-oxy)vinylsilane.

Silanization is a chemical attachment of a silane to the surface of the light-colored filler. The attachment is effected by condensation reactions between hydrolyzable groups of the silanes used and chemical groups on the surface of the filler. The silanization of the light-colored filler is preferably conducted in a rubber mixture (in situ silanization) at temperatures in the range from 140° C. to 160° C. For this purpose, in each case, at least one rubber, silane and light-colored filler are mixed and subjected to a temperature within the above-specified range.

The rubber mixture here typically contains 5% to 15% by weight of silanizing agent based on the total proportion of light-colored fillers.

The rubber mixtures here may comprise further fillers, further additives such as aging stabilizers, plasticizers, etc., crosslinking agents, vulcanization accelerators and/or vulcanization retardants and/or further auxiliaries.

Further fillers are, for example, carbon-based fillers, for example carbon black, graphite, carbon nanotubes, and magnetizable fillers such as carbonyl iron powder, iron oxides, ferrites and/or fibers, for example aramid fiber pulp and carbon fibers.

Suitable aging stabilizers are coloring and noncoloring aging stabilizers, for example paraphenylendiamines, isopropylphenylparaphenylenediamine (IPPD), para-phenylene-diamine (6PPD), N,N-ditolyl-p-phenylenediamine (DTPD), etc., amines, for example trimethyl-1,2-dihydroquinoline (TMQ), (phenyl)amine]-1,4-naphthalenedione (PAN), bis(4-octylphenyl)amine (ODPA), styrenized diphenylamine (SDPA), mono- and bisphenols, for example 2,2'-methylenebis(4-methyl-6-tert-butylphenol) (BPH), 2,2'-isobutylidenebis(4,6-dimethylphenol) (NKF), 2,2'-dicyclopentadienylbis(4-methyl-6-tert-butylphenol) (SKF), 2,2'-methylenebis(4-methyl-6-cyclohexylphenol) (ZKF), 2,6-di-tert-butyl-p-cresol (BHT), substituted phenol (DS), styrenized phenols (SPH), mercaptobenzimidazoles, for example 2-mercaptobenzimidazole (MBI), 2-mercaptomethylbenzimidazoles (MMBI), zinc 4- and 5-methyl-2-mercaptobenzimidazoles (ZMMBI).

Plasticizers are, for example, long-chain esters and/or ethers, such as thioesters, phthalic esters, alkylsulfonic esters, adipic esters, sebacic esters, dibenzyl ethers and/or mineral oils (paraffinic, aromatic, naphthenic or synthetic oils).

Crosslinking agents in the context of the invention are network node formers. Network node formers are molecules that can connect two individual polymer chains to one another, for example

- sulfur (soluble or insoluble) and/or sulfur donors, for example dithlomorpholines (DTDM), tetramethylthiuram disulfides (TMTD), tetraethylthiuram disulfide (TETD), dipentamethylenethiuram tetrasulfides (DPTT), phosphoryl polysulfides, for example Rhenocure® SDT/S from Rhein Chemie Rheinau GmbH and/or
- peroxides, for example di-tert-butyl peroxides, di(tert-butylperoxy)trimethyl-cyclohexanes, di(tert-butylperoxyisopropyl)benzenes, dicumyl peroxides, dimethyl-di(tert-butylperoxy)hexyne, butyl di(tert-butylperoxy)valerate,
- resorcinol, aldehyde-amine condensation products, for example hexamethylenetetramine, resorcinol-formaldehyde precondensates and/or vulcanization resins, for example halomethylphenol resin,
- quinone dioximes,
- bisphenols.

Accelerators are, for example:
- carbamates or triazines, for example hexamethylenediamine carbamate (HMDC), organic triazines,
- thiazoles, for example 2-mercaptobenzothiazole (MBT), zinc mercaptobenzothiazole (ZnMBT), thiadiazoles (TDD),
- sulfenamides, such as cyclohexylbenzothiazolesulfenamides (CBS), dibenzothiazyl disulfide (MBTS), butylbenzothiazolesulfenamide (TBBS), dicyclohexyl-benzothiazolesulfenamide (DBS), 2-(4-morpholinylmercapto)benzothiazole (MBS),
- thiurams, such as tetramethylthiuram monosulfide (TMTM), tetraethylthiuram disulfide (TETD), tetramethylthiuram disulfide (TMTD), tetrabenzylthiuram disulfide (TBTD), dipentamethylenethiuram tetra (hexa)sulfide (DPTT),
- dithiocarbamates, such as Zn dimethyldithiocarbamates (ZDMC), Cu dimethyldithiocarbamates, Bi dimethyldithiocarbamates, Zn diethyldithiocarbamates (ZDEC), tellurium diethyldithiocarbamates (TDEC), Zn dibutyldithiocarbamates (ZDBC), Zn ethylphenyldithiocarbamates (ZEPC), Zn dibenzyldithiocarbamates (ZBEC), Ni dibutyldithiocarbamates (NBC), selenium diethyldithiocarbamates (SeEDC), selenium dimethyldithiocarbamates (SeDMC), tellurium diethyldithiocarbamates (TeEDC),
- thiophosphate and dithiophosphate, for example zinc O,O-di-n-butyldithiophosphate (ZBDP), zinc O-butyl-O-hexyldithiophosphate, zinc O,O-diisooctyldithiophosphate (ZOPD), dodecylammonium diisooctyldithlophosphate (AOPD), for example the Rhenogran® ZDT, ZAT, ZBOP products from Rhein Chemie Rheinsu GmbH,
- urea/thioureas, for example ethylenethiourea (ETU), N,N, N'N'-tetramethylthiourea (TMTU), diethylthiourea (DETU), dibutylthiourea (DBTU), 3-(3,4-dichlorophenyl)-1,1-dimethylurea (Diuron) etc., and/or
- xanthogenate accelerators, for example zinc isopropylxanthogenate (ZIX),
- guanidines, for example diphenylguanidine (DPG) and/or N',N-di-ortho-tolylguanidine (DOTG) and the guanidine-free substitute accelerators, such as Rhenogran® XLA 60, Vulcanization retardants, for example N-nitrosodiphenylamine, N-cyclohexylthiophthalimide (CPT), e.g. Vulkalent® G), sulfonamide derivatives (e.g. Vulkalent® E/C), phthalic anhydride (e.g. Vulkalent® B/C), or benzoic anhydride.

Auxiliaries are, for example, dispersion auxiliaries, for example fatty acids, steric acid, oleic acid, activators, for example zinc oxide, lead oxide, bismuth oxide, lithium carbonate, sodium carbonate and/or calcium hydroxide, magnesium oxide, flame retardants such as antimony oxide, etc.

The aforementioned fillers, additives, plasticizers, crosslinking agents, vulcanization accelerators and/or vulcanization retardants, auxiliaries etc. are familiar to the person skilled in the art and can also be used in granulated form, for example as polymer-bound additives or as the crosslinker masterbatches described in EP2314442A.

The rubber mixtures can be processed further, for example to give masterbatches, base mixtures and crosslinkable rubber mixtures.

Masterbatches typically have a high proportion of additives based on rubber and contain, for example:

2.5% to 90% by weight of rubber

0% to 50% by weight of plasticizers

2% to 80% by weight of silanized light-colored fillers

0% to 20% by weight of dispersion auxiliaries

0% to 10% by weight of silane

Base mixtures are rubber mixtures to which crosslinking agents and optionally vulcanization accelerators still have to be added before practical use, for example:

100 phr rubber 0 to 100 phr plasticizers 0 to 200 phr fillers, of which at least 10% are silanized light-colored fillers, 0 to 30 phr auxiliaries and 0 to 10 phr aging stabilizers.

Crosslinkable rubber mixtures are rubber mixtures which additionally contain 0.01 to 20 phr crosslinking agents and optionally vulcanization accelerators and vulcanization retardants.

Particular preference is given to crosslinkable rubber mixtures containing, inter alia, 30 to 110 phr carbon black and precipitated silica, 3 to 9 phr silane, 2 to 7 phr zinc oxide and 0.5 phr to 4 phr sulfur and 1 to 5 phr accelerators.

The invention also encompasses a method of producing crosslinkable rubber mixtures comprising silanized light-colored filler, in which one or more crosslinking agents are added before, during and/or after the production of the rubber mixture of the invention. The crosslinking agents can thus be added before, during and/or after the mixing of the light-colored filler with silanizing agent and rubber.

The masterbatches, the base mixture and the crosslinkable rubber mixture are preferably produced by the processes familiar to the person skilled in the art as described, for example, in PCT/EP2009/058041. Fillers, auxiliaries, crosslinking agents and/or aging stabilizers are mixed here together with the rubber in a mixing unit. Suitable mixing units are, for example, internal mixers, roll systems, extruders. Internal mixers with an exit extruder are particularly suitable.

In a further embodiment of the invention, in a first step, the base mixture is produced in a mixing unit. Temperatures of more than 140° C. to 160° C. can be achieved here. In a second production step, after the base mixture has cooled down to temperatures less then 130° C., crosslinking agents are added to the base mixture in a further mixing unit. Some of the crosslinking agents, vulcanization accelerators and/or vulcanization retardants may already have been added to the base mixture in the first production step.

In a further preferred embodiment, the base mixture is produced in a mixing unit in the first step. Temperatures of more than 140° C. to 160° C. can be achieved here. In a second step, the mixture is homogenized. It is likewise possible here to reach temperatures of more than 140° C. to 160° C. In a third production step, after the base mixture has cooled down to temperatures less than 130° C., crosslinking agents are added to the base mixture in a further mixing unit. Some of the crosslinking agents, vulcanization accelerators and/or vulcanization retardants may already have been added to the base mixture in the first or second production step.

Particular preference is given to continuous processes in which the masterbatches, base mixtures or else the crosslinkable rubber mixtures are produced in one or more process steps with one or more extruders.

Very particular preference is given to the production process described in DE-A-102008040138 for crosslinkable rubber mixtures, in which the base mixture is produced in at least one batchwise kneader process, and crosslinking agents in the form of the crosslinker masterbatches described in described EP-A-2314442 are added to the base mixture and the crosslinker masterbatches are mixed with the base mixture in a continuous process with an extruder.

The invention further relates to a process for producing vulcanizates comprising the inventive production of crosslinkable rubber mixtures comprising silanized light-colored fillers and subsequent vulcanization at a temperature in the range from 100° C. to 200° C.

The invention likewise encompasses the use of measurement apparatuses for determination of the ultrasound wave amplitude a, integrated ultrasound wave amplitude A and/or ultrasound wave intensity i, the integrated ultrasound wave amplitude I of one or more frequencies in a range from 4 to 10 MHz, preferably from 5 to 7 MHz, for the test method of the invention, for the production methods of the invention for rubber mixtures in general and crosslinkable rubber mixtures in particular. This preferably also, encompasses the use of the measurement apparatuses mentioned for determining the relative attenuation coefficient $\alpha_{rel}$ in the above-mentioned processes.

The present invention thus provides a method of verifying silanization, which allows inline monitoring of the in situ silanization of light-colored fillers, especially precipitated silicas. This enables continuous in situ silanization in the production of rubber mixtures containing silanized light-colored fillers, and representative monitoring of the rubber mixture under production conditions. The process is additionally nondestructive and has a high tolerance for carbon black as an additional constituent of the rubber mixture.

The examples, illustrations and figures which follow serve to illustrate the invention, without having any limiting effect.

EXAMPLES

The components of a typical rubber mixture for tire treads according to table 1 were provided.

TABLE 1

| Formulation of a typical rubber mixture for tire treads | | | | |
|---|---|---|---|---|
| Trade name | | | Density [g/cm³] | Amount [phr] |
| Buna CB 24 | Butyl rubber | Lanxess Deutschland GmbH | 0.91 | 30 |
| Buna VSL 5025-2 HM | Solution styrene-butadiene rubber | Lanxess Deutschland GmbH | 0.95 | 70 |
| CB N-330 | Carbon black | | 1.8 | 5 |
| Ultrasil GR 7000 | Silica | Evonik industries AG | 2 | 90 |
| ASM-TMQ | 2,2,4-Trimethyl-1,2-dihydroquinoline | | 1.1 | 1.5 |
| ASM-6PPD | N-1,3-Dimethylbutyl-N'-phenyl-b-phenylene-diamine | | 1 | 2 |
| Stearic acid | | | 0.89 | 1 |
| WS zinc oxide | | Norzinco GmbH | 5.6 | 2 |
| Si-69 | Bis(triethoxysilylpropyl) tetrasulfide | Evonik Industries AG | 0.866 | 10 |

These components were mixed according to the mixing method in table 2 in various batches.

TABLE 2

| Mixing method | | |
|---|---|---|
| Time | Mixture constituent | Comment |
| 0-0.75' | Polymers | |
| 0.75'-1'20" | Silica + Si69 + ZnO | Ram up |
| 1'20" | | Ram down |
| 2' | Aging stabilizers + stearic acid | |

TABLE 2-continued

Mixing method

| Time | Mixture constituent | Comment |
|---|---|---|
| 3.5' | | invert |
| 5' | | Ejection |

In the case of batches R1M1 to R5M2, the mixing parameters of speed and feed temperature were varied according to table 3.

TABLE 3

Mixed batches of a typical rubber mixture from table 1

| Mixing parameters | | 1st mixing stage Batch | | | | 2nd mixing stage |
|---|---|---|---|---|---|---|
| | | R1M1 | R2M1 | R3M1 | R4M1 | R5M2 |
| Fill level | [%] | 70 | 70 | 70 | 70 | 70 |
| Speed | [rpm] | 70 | 40 | 40 | 40 | 70 |
| Feed temperature | [° C.] | 70 | 70 | 50 | 40 | 70 |
| Mixing time | [min.] | 5 | 5 | 5 | 5 | 3 |
| Energy input | [W] | 135 | 134 | 149 | 146 | 110 |
| Ejection temperature $T_A$ | [° C.] | 147 | 126 | 117 | 112 | 142 |

The mixture is, as specified in table 3, mixed in a 1.5 l internal mixer (Intermesh) from Gurnix S.A. for 5 min. The rubber mixture here contains silica and silane inter alia, and a little carbon black.

The silane reacts above 140° C. with the silica surface. Below 140° C., no reaction takes place. As a result of the different mixing parameters, different values for the ejection temperature $T_A$ are achieved below (batch R2M1 to R4M1) and above (batch R1M1 and R5M2) 140'C. Batch R5M2 was additionally mixed for a second time in the internal mixer in order to complete the reaction (R5M2). This corresponds to a typical process for in situ silanizations in the tire industry. After the mixing process in the internal mixer, the mixture batches were homogenized on a twin roller system from Rubicon Gummitechnik und Maschinentechnik GmbH at a temperature of 50° C. (incised three times on the left and three times on the right) and drawn off to give a mixed sheet. Strips were cut out of the sheet. The strips were fed to an EEK32.12L single-shaft extruder from Rubicon Gummitechnik und Maschinentechnik GmbH with low mixing action. At the extruder outlet is a sensor head equipped with two opposite ultrasound transducers separated by 10 mm, and additionally a temperature sensor T1 with a probe that projects into the mixture flow and a pressure/temperature sensor. This temperature sensor measures the pressure p and the temperature T2 at the rubber/metal interface. The flow channel in the sensor head has a width of 20 mm and a height of 10 mm. The diameter of the ultrasound transducers is 8 mm. The sensor head and extruder were kept at a controlled temperature of 120° C. The screw speed was 20 rpm. This corresponds to a throughput of about 1 kg of rubber mixture per 10 min.

The inline quality control was conducted with a pair of K6V1 ultrasound transducers from GE Sensing & Inspection Technologies GmbH in transmission. The ultrasound transducers were actuated with the PCM 100LAN test electronics from Inoson GmbH. 10 to 40 ultrasound pulses per second were generated in the ultrasound transducer with the aid of the piezoelectric effect. The ultrasound transducer converts the voltage pulses to ultrasound signals. The ultrasound transducers were excited here with 7 bursts at the intrinsic frequency of the ultrasound transducer of 6 MHz. The ultrasound pulse of the transmitter moves through the extruded rubber mixture and is attenuated by the rubber mixture. The oscillation amplitude a of the ultrasound signal is lowered. The receiver receives the sound signal and converts it to a voltage signal. The voltage signal is amplified by the hardware of the PCM100LAN at 32.45 dB and passed to a computer. With the aid of the computer, the first sound pulse of the A scan is evaluated by what is called fast Fourier transformation (FFT). The amplitude spectrum a(f) thus obtained as a function of the ultrasound frequency f was integrated in five different frequency ranges (cf. table 4) and the logarithm was formed. The ln $A(f_{min},f_{max})$ values thus obtained for the integral converted to a logarithm are plotted for the various mixture batches R1M1 to R4M1 and R5M2 as a function of time t. This is done before the mixture exits from the sensor head at the outlet of the extruder. The dwell time of the mixture in the sensor head was less than 1 minute. The result of the frequency range $f_{min}$=5.2 MHz to $f_{max}$=6.9 MHz is shown for each mixture batch in FIGS. 4 to 8. In addition, the coefficient of variation CV is shown for the values ln $A(f_{min},f_{max})$ for 50 measurement points. The coefficient of variation CV is a measure of the mixing quality.

The values for ln $A(f_{min},f_{max})$ are used to calculate the relative attenuation coefficient $\alpha_{rel}$ $(f_{max},f_{min})$ by the Beer-Lambert law.

$$\alpha_{rel.}(f_{min},f_{max})=(\ln A_{rel.}(f_{min},f_{max})-\ln A(f_{min},f_{max}))/x \quad (1d)$$

In this formula, x is the distance between the ultrasound transducers. In eq. (1d) is the mean value of ln $A(f_{min},f_{max})$ of the reference mixture R5M2 (standard mixing method) for a duration for the extrusion of Δt=5 min. Table 4 shows the mean values for the relative attenuation coefficient $\alpha_{rel.}(f_{min},f_{max})$ for a period of time from Δt=4 min to Δt=8 min, for the extrusion for each mixture batch. In addition, the standard deviation σ of the relative attenuation coefficients $\alpha_{rel.}(f_{min},f_{max})$ was determined according to eq. (1d). In addition, the mean value of the pressure sensor p and the mean values for the temperature sensor T1 with probe and T2 without probe are reported. The speed of sound $V_S$ is determined from the distance x and the time $t_{oF}$ before the first voltage amplitude. It is necessary here to take account of the time $t_{US}$=4 μs is of the ultrasound signal within the inlet of the ultrasound transducer according to eq. (2).

$$V_S=x/(t_{oF}-t_{US}) \quad (2)$$

In addition to the ultrasound indices, the Mooney viscosity ML1+4 (100° C.) was determined as a nonrepresentative offline standard quality control.

TABLE 4

Analysis of the extruded batches from table 3

|  |  | Extruded batch after | | | | |
|---|---|---|---|---|---|---|
|  |  | 1st mixing stage Batch | | | | 2nd mixing stage |
|  |  | R1M1 | R2M1 | R3M1 | R4M1 | R5M2 |
| Standard process control |  |  |  |  |  |  |
| Mooney viscosity ML1 + 4 (100° C.) Measurement conditions | [MU] | 143 | 150 | 151 | not measurable | 122 |
| Pressure ρ | [bar] | 31 ± 3 | 34 ± 1 | 35 ± 1 | 38 ± 1 | 34 ± 2 |
| T1 | [° C.] | 124 ± 1 | 125 ± 1 | 125 ± 1 | 124 ± 1 | 124 ± 1 |
| T2 | [° C.] | 122 ± 1 | 122 ± 1 | 122 ± 1 | 121 ± 1 | 121 ± 1 |
| Ultrasound indices |  |  |  |  |  |  |
| $V_S$ | [m/s] | 1214 ± 3 | 1218 ± 2 | 1220 ± 3 | 1222 ± 2 | 1218 ± 3 |
| Rel. attn. coeff. $\alpha_{rel.}$ |  |  |  |  |  |  |
| (1.1 MHz to 1.7 MHz) | [1/m] | 1 ± 2 | 3 ± 2 | 3 ± 2 | 2 ± 2 | 0 ± 1 |
| (1.7 MHz to 2.8 MHz) | [1/m] | 3 ± 2 | 4 ± 2 | 3 ± 2 | 2 ± 2 | 0 ± 2 |
| (2.8 MHz to 4.0 MHz) | [1/m] | 4 ± 2 | 6 ± 2 | 6 ± 3 | 4 ± 2 | 0 ± 2 |
| (4.0 MHZ to 5.2 MHz) | [1/m] | 5 ± 2 | 9 ± 3 | 9 ± 3 | 9 ± 2 | 0 ± 2 |
| (5.2 MHz to 6.9 MHz) | [1/m] | 7 ± 3 | 14 ± 3 | 15 ± 4 | 14 ± 2 | 0 ± 2 |

It can be seen in table 4 that the values for the relative sound attenuation αrel. over and above 4 MHz for the batch R1 M1 are significantly less than the values for batches R2D1, R3M1 and R4M1 (FIG. 9). The ejection temperature TA of the batch R1 M1 is above 140° C., and so the silanization reaction was able to take place. The ejection temperature TA of the batches R2M1, R3M1 and R4M1 was below 140° C., and so no silanization reaction was able to take place. Below 4 MHz, the difference relative to the standard deviation 6 of the values for the relative sound The low values for R1 M1 and for R5M2 compared to R3M1 and R4M1 cannot be attributed to improved dispersion of the filler (here: the silica), as described in A. Schroder, L. Graff. L. Wawrzinski, Kautschuk Gummi Kunststoffe, 67 (2015), 11. The ultrasound amplitude increases therein with increasing filler dispersion; at the same time, the coefficient of variation CV decreases. By contrast, the coefficient of variation CV of the mixtures R1M1 and R5M2 (in FIG. 4 and FIG. 8) assumes values above 0.2%. The values for the coefficient of variation of the mixtures R3M1 and R4M1, by contrast, are all less than 0.2%. It appears that the higher energy input during the kneading process for batches R3M1 and R4M1, owing to the lower temperature, leads to improved filler dispersion. Nevertheless, the values for ln A ($f_{min.}$, $f_{max.}$) of the batches R3M1 and R4M1 are lower than for R1 M1 and R5M2. Since batches with the same composition were used and no significant changes in the measurement conditions (identical values for p, T1, and T2) were observed in the inline quality control, the different relative sound attenuation coefficients αrel($f_{min.}$, $f_{max.}$) can only be explained by a chemical reaction of the silica surface with the silane.

Moreover, there is a further drop in the relative sound attenuation coefficient $\alpha_{rel.}$ ($f_{min.}$, $f_{max.}$) when the silanization is completed in accordance with the standard method σ in a second mixing step (comparison of R1M1 and R5M2). The values for the relative sound attenuation coefficient $\alpha_{rel.}$($f_{min.}$,$f_{max.}$) at a frequency of >4 MHz correlate with the values for the Mooney viscosity ML1+4 (100° C.) as the offline standard method for quality control for uncrosslinked rubber mixtures (FIG. 10). This clearly shows that the quality of the in situ silanization can be determined with the aid of the determination of the relative sound attenuation coefficent $\alpha_{rel.}$($f_{min.}$,$f_{max.}$).

What is claimed is:

1. A method of in-situ testing of the silanization of light-colored fillers in rubbers, the method comprising:
    extruding a mixture comprising at least one silanized light-colored filler and at least one rubber to form an extrudate,
    subjecting the extrudate to ultrasound waves within a frequency range from 4 to 10 MHz, and
    measuring the signal intensity of the ultrasound waves after transmission of the ultrasound waves through the extrudate, wherein the measured intensity relates directly to an amount of silanization.

2. The method as claimed in claim 1, further comprising determining the relative attenuation coefficient $\alpha_{rel}$ of the extrudate in the frequency range of the ultrasound waves, wherein the relative attenuation coefficient relates inversely to an amount of silanization.

3. The method as claimed in claim 2, further comprising:
    determining the standard deviation of the relative attenuation coefficient $\alpha_{rel}$, and
    using the standard deviation to monitor the dispersion of the light-colored filler in the extrudate.

4. The method as claimed in claim 2, wherein:
    the light-colored filler is selected from mica, kaolins, chalks, calcium carbonates, talc, zinc oxides, aluminum oxides, titanium dioxides, silica and silicates;
    the ultrasound waves are produced by an emitter and detected at a receiver and the distance between the emitter and the receiver is more than 5 mm to 25 mm, and
    the rubber mixture comprises 50 to 250 phr of the light-colored filler.

5. The method as claimed in claim 4, wherein:
the ultrasound waves have a frequency of 5 to 7 MHz;
the distance between the emitter and the receiver is 10 mm to 25 mm, and
the rubber mixture comprises 60 to 150 phr of the light-colored filler.

6. The method as claimed in claim 5, wherein:
the distance between the emitter and the receiver is 15 to 20 nm; and
the rubber mixture comprises 70 to 100 phr of the light-colored filler,
the silanized filler is formed in the extruder from at least one light-colored filler and at least one silanizing agent at a silanization temperature of 140 to 160° C.
the light-colored filler comprises silica; and
the method further comprises monitoring the dispersion of the light-colored filler in the extrudate by at least one of:
determining the coefficient of variation of the logarithm of the ultrasound wave intensity or of the ultrasound wave amplitude ln A, and using the coefficient of variation to monitor the dispersion of the light-colored filler in the extrudate; and
determining the standard deviation of the relative attenuation coefficient $\alpha_{rel}$, and using the standard deviation to monitor the dispersion of the light-colored filler in the extrudate.

7. The method as claimed in claim 1, further comprising:
determining the coefficient of variation of the logarithm of the ultrasound wave intensity or of the ultrasound wave amplitude ln A, and
using the coefficient of variation to monitor the dispersion of the light-colored filler in the extrudate.

8. The method as claimed in claim 1, wherein the ultrasound waves are produced by an emitter and detected at a receiver and the distance between the emitter and the receiver is more than 5 mm to 25 mm.

9. The method as claimed in claim 1, wherein:
the rubber mixture comprises 50 to 250 phr of the light-colored filler; and
the light-colored filler comprises mineral natural and synthetic fillers that are not based on carbon black.

10. The method as claimed in claim 1, wherein the silanized filler is formed in the extruder from at least one light-colored filler and at least one silanizing agent.

11. A method of producing rubber mixtures comprising silanized light-colored fillers, the method comprising:
mixing at least one light-colored filler with at least one rubber and at least one silanizing agent, and
silanized the light-colored filler, and
testing at least a portion of the rubber mixture by the method as claimed in claim 1.

12. The method as claimed in claim 11, wherein the silanization is effected at a temperature of 140 to 160° C.

13. The method as claimed in claim 11, wherein the process is conducted continuously or as a batchwise process, preferably continuously.

14. The method as claimed in claim 11, wherein the silanizing agent comprises a silane, preferably bis(3-triethoxysilypropyl) tetrasulfide.

15. The method of producing rubber mixtures according to claim 11, wherein more than 10% by volume of the rubber mixture is tested.

16. The method of producing rubber mixtures according to claim 11, wherein 100% by volume of the rubber mixture is tested.

17. A method of producing crosslinkable rubber mixtures comprising silanized light-colored filler, the method comprising producing the rubber mixtures according to the method as claimed in claim 11, and adding one or more crosslinking agents before, during, and/or after the production of the rubber mixture.

18. A method of producing vulcanizates comprising the crosslinkable rubber mixtures produced in accordance with the method as claimed in claim 17, the method comprising vulcanizing the crosslinkable rubber mixture at a temperature of 100° C. to 200° C.

19. The use of measurement devices for determining the sound wave amplitude and/or sound wave intensity at a frequency of the ultrasound waves within a range from 4 to 10 MHz, for a method as claimed in claim 1.

20. The use of measurement devices as claimed in claim 19, wherein the attenuation coefficient is determined in the region of the frequency of the ultrasound waves.

* * * * *